(12) United States Patent
Moreau et al.

(10) Patent No.: US 9,169,900 B1
(45) Date of Patent: Oct. 27, 2015

(54) SHACKLE ASSEMBLY WITH PIN AND RETAINING RING

(71) Applicant: Ty-Flot, Inc., Manchester, NH (US)

(72) Inventors: Darrell A. Moreau, Manchester, NH (US); Andre W. Moreau, Spring Hill, FL (US)

(73) Assignee: Ty-Flot, Inc., Manchester, NH (US)

( * ) Notice: Subject to any disclaimer, the term of this patent is extended or adjusted under 35 U.S.C. 154(b) by 0 days.

(21) Appl. No.: 14/299,150

(22) Filed: Jun. 9, 2014

(51) Int. Cl.
*F16G 15/02* (2006.01)
*F16G 15/06* (2006.01)
*F16G 15/04* (2006.01)

(52) U.S. Cl.
CPC ............... *F16G 15/06* (2013.01); *F16G 15/02* (2013.01); *F16G 15/04* (2013.01)

(58) Field of Classification Search
CPC .......... F16G 15/02; F16G 15/04; F16G 15/06
See application file for complete search history.

(56) References Cited

U.S. PATENT DOCUMENTS

| | | | | |
|---|---|---|---|---|
| 1,253,971 A | * | 1/1918 | Hipsher | 59/95 |
| 2,010,853 A | | 8/1935 | Dyer | |
| 2,369,344 A | | 2/1945 | Ehmann | |
| 3,274,879 A | * | 9/1966 | Poller | 411/351 |
| 3,453,822 A | * | 7/1969 | Crook, Jr. | 59/85 |
| 3,994,127 A | * | 11/1976 | Gower | 59/85 |
| 4,094,141 A | * | 6/1978 | Rehbein | 59/93 |
| 4,095,416 A | | 6/1978 | Issard | |
| 4,274,252 A | | 6/1981 | Cavender | |
| 5,460,418 A | | 10/1995 | Falls | |
| 7,155,895 B2 | | 1/2007 | Moehnke et al. | |
| 7,540,140 B1 | | 6/2009 | Diaz et al. | |
| 7,614,209 B1 | | 11/2009 | Payne et al. | |
| D698,621 S | | 2/2014 | Moreau et al. | |
| 8,966,874 B2 | * | 3/2015 | Moreau et al. | 59/85 |
| 9,038,360 B1 | | 5/2015 | Moreau et al. | |
| 2008/0245049 A1 | | 10/2008 | Pengg | |
| 2011/0265442 A1 | * | 11/2011 | Segura | 59/86 |

* cited by examiner

*Primary Examiner* — David B Jones
(74) *Attorney, Agent, or Firm* — Robert R. Deleault, Esq.; Mesmer & Deleault, PLLC (57) ABSTRACT

A shackle assembly has a body that includes a first side member with a first side aperture, a second side member with a second side aperture, and at least one end portion extending between and connecting the first side member and the second side member. At least one of the apertures defines an annular recess. A pin has a first end portion received in the first side aperture, a second end portion received in the second side aperture, and a pin body extending between the first end portion and the second end portion. At least one end portion of the pin defines an annular groove corresponding to the annular recess(es). A retaining ring with a pair of open ends is seated in the annular groove and extends radially into the corresponding annular recess, thereby preventing the pin from being removed from the body.

14 Claims, 8 Drawing Sheets

SHACKLE ASSEMBLY WITH PIN AND RETAINING RING

BACKGROUND OF THE INVENTION

1. Field of the Invention

The present invention relates generally to hand tools and connectors. More particularly, the present invention relates to shackle-type connectors.

2. Description of the Prior Art

Traditionally, a shackle has a U-shaped metal bracket (also known as a clevis) with two arms. The ends of the two arms span an opening between them, which is closed with a bolt or clevis pin inserted through openings in the ends of the arms. Shackles are commonly used to connect multiple items together or secure items to a chain or rope. In some cases, the user loops one end of a strap around the clevis or clevis pin with the other end of the strap being secured to a fixed object. Similar to a bolt, one end of the clevis pin often has an enlarged head or cap that prevents the pin from passing completely through openings in the clevis arms. The opposite end of the clevis pin has a hole passing transversely through the pin's end. A clevis pin may be held in place by inserting a cotter pin or other retaining device through the hole in the end of the clevis pin, thereby preventing the clevis pin from passing through the holes in the clevis. In other shackles, the clevis pin is secured by nuts screwed onto one or both ends of a threaded clevis pin.

A related device, known as a hammerlock link, is useful to connect two closed loops, such as chain links. A hammerlock link has two U-shaped metal pieces connected together at the ends of each arm of the U-shaped pieces. Each U-shaped piece has an open end defined by a pair of arms forming the U shape. Each arm of the U-shaped piece has an opening passing transversely through the end of the arm, much like a clevis. The openings in the ends of the arms of both U-shaped pieces are aligned and connected together with a single pin that inserts through the openings. The pin in some hammerlock links is held in place by placing a split sleeve over a middle portion of the pin positioned between the U arms of each U-shaped piece. The outer diameter of the split sleeve is larger than the openings in the arms and therefore prevents the pin from sliding out through these openings. In other embodiments, nuts are threaded onto one or both ends of the pin as described above with a clevis.

SUMMARY OF THE INVENTION

The above-mentioned devices have been used for years, but remain bulky for use with small hand-held objects such as hand tools. Additionally, retaining or securing the pin to these devices is often done with questionable integrity. Threaded nuts come unscrewed from ends of a pin, even when a nut has a locking insert. For example, a locking nylon insert of a lock nut may become worn or otherwise fail to lock the nut in place, thereby allowing the nut to loosen and fall off. Cotter pins and nuts can be sheared off or broken since they remain exposed at the outside of the shackle and are relatively light-duty objects. A split sleeve used over pins in hammerlock shackles may similarly catch on objects along the split, thereby damaging or opening the sleeve to allow the hammerlock link to open. Further, a split sleeve is difficult to install without proper tools designed for such installation.

In some cases, failure of the device is a minor inconvenience. In other cases, a shackle failure can waste valuable time and resources, cause injury and damage due to the separating links, increase operating costs by necessitating replacement parts and repairs, and introduce foreign material to industrial systems that contaminates a system or requires shut down of the system to retrieve the foreign object. Therefore, to overcome limitations of existing devices, a need exists for an improved shackle, such as a shackle assembly with a locking pin.

It is an object of the present invention to provide a shackle assembly that reinforces safety.

It is another object of the present invention to provide improved performance over existing connectors.

It is another object of the present invention to provide a shackle assembly that reduces operating costs.

It is another object of the present invention to improve the reliability of shackle connectors.

The present invention achieves these and other objectives by providing a shackle assembly that includes a unitary rigid body, a pin, and a retaining ring positioned between the pin and the body. In one embodiment, the body defines an open region and has a first side member with a first side aperture extending transversely therethrough, a second side member spaced apart from the first side member and having a second side aperture extending transversely at least partially through the second side member, and at least one end portions extending between and connecting the first side member and the second side member. The second side aperture is positioned opposite the first side aperture and axially aligned with the first side aperture. One or both of the first side aperture and the second side aperture define an annular recess. A pin has a first end portion received in the first side aperture, a second end portion received in the second side aperture, and a pin body extending between the first end portion and the second end portion along a central longitudinal axis. At least one of the first end portion and the second end portion defines an annular groove corresponding to the annular recess of the respective aperture. At least one annular retaining ring with a pair of open ends is seated in the annular groove and extends radially into the corresponding annular recess, thereby preventing the pin from being removed from the body.

In another embodiment, the body includes a first end portion and a second end portion, where the body defines a closed geometry. In one embodiment, the closed geometry is a loop, a ring, an oval, a triangle, a trapezoid, a "racetrack" shape, or a rectangle In another embodiment, the first end portion of the pin has an outside surface with a sloped region of increasing diameter and the first side aperture has a corresponding inside surface with a sloped region of increasing diameter.

In another embodiment, the second end portion threadably engages the second side aperture.

In another embodiment, the first side aperture defines a first annular recess and the second side aperture defines a second annular recess. The first end portion of the pin defines a first annular groove and the second end portion defines a second annular groove. The assembly includes a first annular ring corresponding to the first annular recess and a second annular ring corresponding to the second annular recess. In one such embodiment, the first end portion and the second end portion of the pin each have a sloped region of increasing diameter.

In another embodiment, the shackle assembly also includes a second body member. The second body member has a first longitudinal portion with a first end, a second end, and a first opening through the second end of the first longitudinal portion. It also has a second longitudinal portion with a first end, a second end, and a second opening through the second end of the second longitudinal portion. An end portion is connected between the first end of the first longitudinal portion and the first end of the second longitudinal portion.

The pin extends through the first opening and the second opening of the second body member.

In another aspect of the present invention, a shackle assembly kit includes the body, pin, and retaining ring(s) as components to be assembled. The kit also includes instructions for installing the annular retaining ring(s) in the annular recess and advancing the pin through the first opening and into the second opening with the annular retaining ring seating in the annular groove, thereby preventing the pin from being removed from the body.

DETAILED DESCRIPTION OF THE PREFERRED EMBODIMENT

Figure 1A:
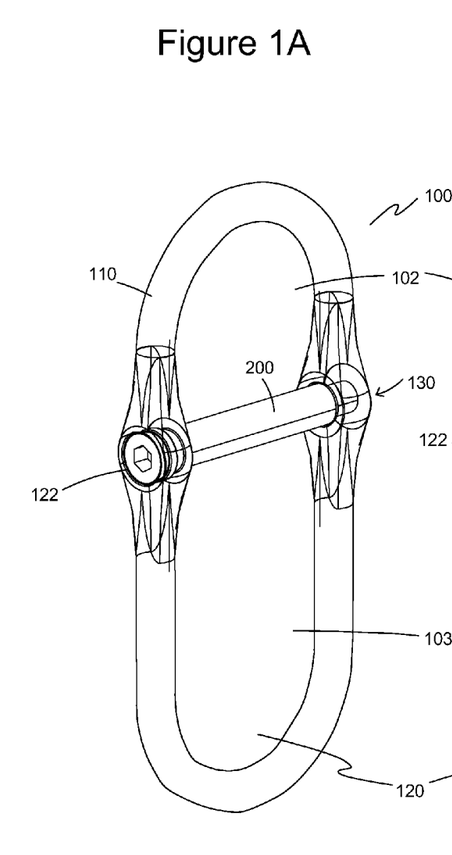
FIG. 1A is a front perspective view of one embodiment of the present invention showing a shackle assembly with a unitary body and a pin installed through openings of the body.
Figure 1B:
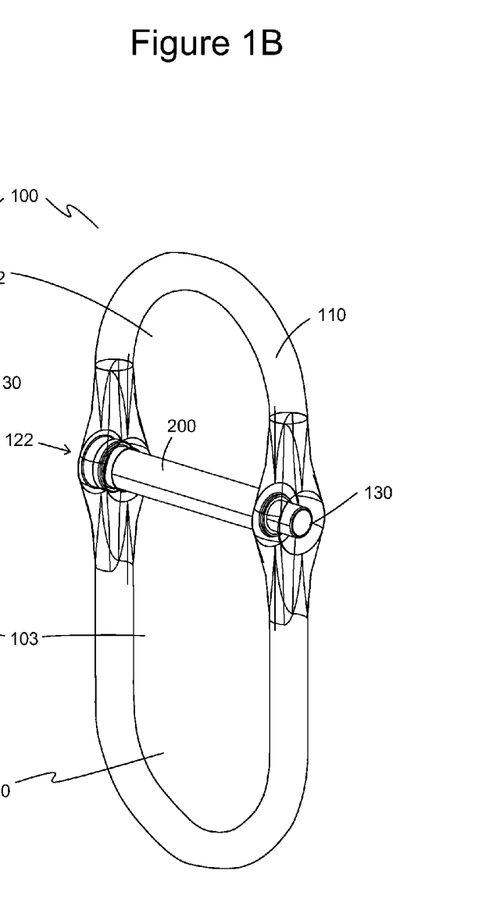
FIG. 1B is a rear perspective view of the shackle assembly of FIG. 1A showing the hub regions as a wireframe illustration.

Embodiments of a shackle assembly 100 of the present invention are illustrated in FIGS. 1-13. FIGS. 1A and 1B illustrate front perspective and rear perspective views, respectively, of one embodiment of a shackle assembly 100 having a body 110 and a pin 200. Body 110 in this embodiment defines a closed geometry with a "racetrack" shape. In other embodiments, the closed geometry is an oval, circle, rectangle, square, trapezoid, irregular shape, or any other closed geometry. Pin 200 extends transversely through a first pin opening 122 and a second pin opening 130 that are axially aligned and extend through or into body 110. Pin 200 divides a primary opening 120 defined by the closed geometry into a first opening 102 and a second opening 103. As discussed below, pin 200 is retained in body 110 by a retaining ring 290 (shown for example in FIG. 11).

Figure 2A:
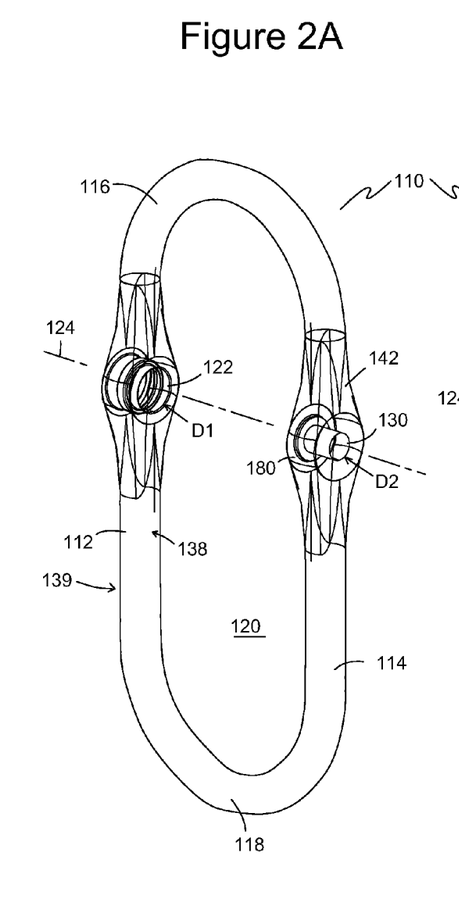
FIG. 2A is a front perspective view of the body of FIG. 1A.
Figure 2B:
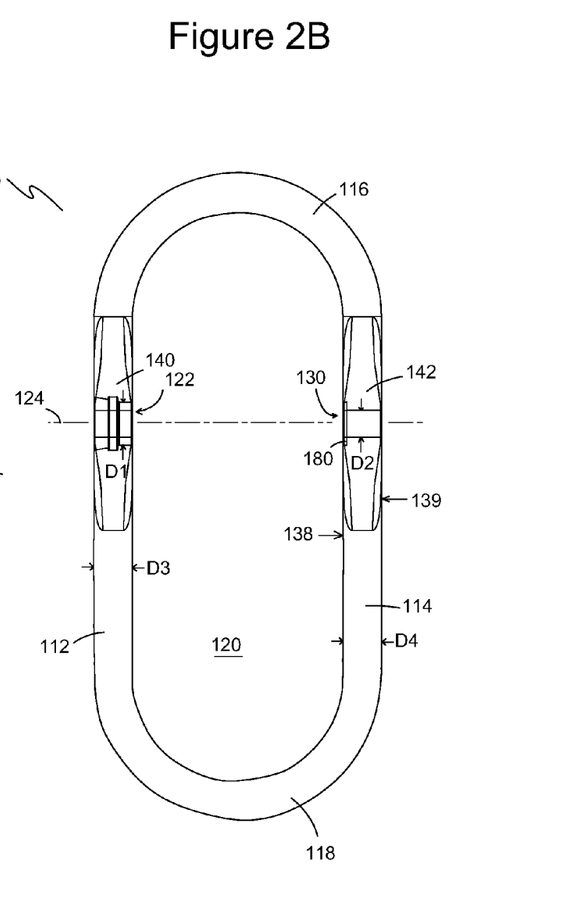
FIG. 2B is a front elevational view of the body of FIG. 1A.

Referring now to FIGS. 2A and 2B, a front perspective view and a front elevational view, respectively, illustrate body 110 as shown in FIG. 1. In one embodiment, body 110 has a longitudinal first side portion 112 and a longitudinal second side portion 114 spaced apart from and extending substantially parallel to first side portion 112. A first end portion 116 extends between and connects first side portion 112 and second side portion 114. A second end portion 118 opposite first end portion 116 extends between and connects first side portion 112 and second side portion 114.

Body 110 has an inside body surface 138 and an outside body surface 139. First and second end portions 116, 118 each connect between longitudinal first and second side portions 112, 114 to define a closed geometry that encloses a primary opening 120. In one embodiment, body 110 is a single structure made with a unitary composition of a rigid or semi-rigid material. For example, body 110 is made of metal, plastics, or other materials, depending on the desired strength, corrosion resistance, weight, and other properties required for the intended use. In one embodiment, body 110 is made of stainless steel or spring steel. First side portion 112 and second side portion 114 need not be parallel. In another embodiment, body 110 lacks second end portion 118 and has an open geometry, such as a U-shape, an E-shape (with third side portion), or the like. In such an embodiment, pin 200 inserts through openings in ends of first side portion 112 and second side portion 114 that define the U-shape or E-shape to close the otherwise open geometry of body 110.

A first pin opening 122 passes transversely through first side portion 112 along a transverse axis 124 extending substantially perpendicular to first and second longitudinal portions 112, 114. First pin opening 122 is preferably a circular bore through first side portion 112 with a predefined diameter D1. In one embodiment, transverse axis 124 passes through midpoints of first and second longitudinal portions 112, 114. In other embodiments, transverse axis 124 is positioned closer to either first end portion 116 or second end portion 118.

A second pin opening 130 passes transversely through second side portion 114, also along transverse axis 124 and axially aligned with first pin opening 122. In one embodiment, second pin opening 130 is a through-opening with a second predefined diameter D2. In other embodiments, second pin opening 130 is a blind hole that extends partially into second side portion 114. In one embodiment, diameter D2 of second pin opening 130 is smaller than diameter D1 of first pin opening 130. Optionally, second pin opening 130 is threaded with machine threads (not shown) for receiving pin 200 having mating threads. Optionally, a recessed region 180 is formed in inside body surface 138 and positioned concentrically with second pin opening 130 to accept a shoulder 254 of pin 200 (shown in FIG. 8).

In one embodiment of body 110, one or both of first and second side portions 112, 114 has a hub region 140, 142, respectively, that is slightly larger and enables first pin opening 112 and/or second pin opening 130 to have a larger diameter D1, D2 than would otherwise be possible when first and second side portion 112, 114 have a uniform diameter/thickness along the entire length. Such a configuration is useful when pin 200 has a body diameter D8 (shown in FIG. 8) that is approximately equal to a diameter D3, D4 of first and second side portions 112, 114, respectively. Hubs 140, 142 would not be necessary, for example, when diameter D8 of pin 200 is smaller than diameters D3, D4 of first and second side portions 112, 114, respectively, or when first and second side portions 112, 114 are sufficiently large to accommodate first pin opening 122 and/or second pin opening 130 without hubs 140, 142. Diameters D3, D4 are preferably equal, but may differ. Hubs 140, 142 are substantially spherical in one embodiment. In another embodiment, hubs 140, 142 extend radially outward from first pin opening 122 and/or second pin opening 130. Thus, hubs 140, 142 occupy regions that are perpendicular to transverse axis 124 and that include first and second side portions 112, 114, respectively.

Figure 3A:
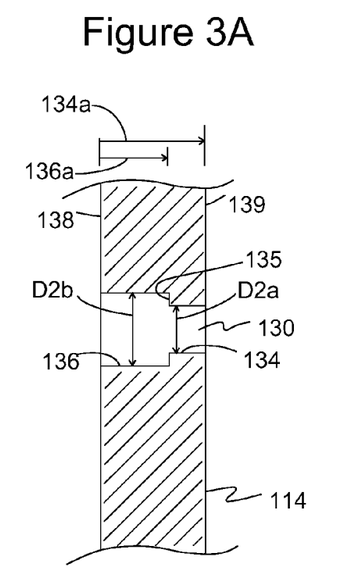
FIG. 3A is a cross sectional view of a portion of the second side member showing one embodiment of the second side aperture of the present invention.
Figure 3B:
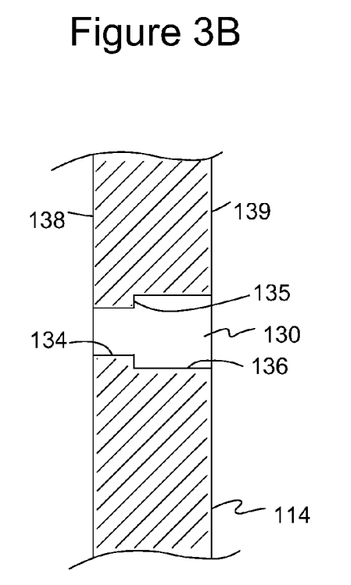
FIG. 3B is a cross sectional view of a portion of the second side member showing another embodiment of the second side aperture of the present invention.

Referring now to FIGS. 3A-3B, cross-sectional views of alternate embodiments of body 110 show second pin opening 130 formed as a two-part opening with a smaller opening portion 134 with diameter D2a and a larger opening portion 136 with diameter D2b. As shown in FIG. 3A, a larger opening portion 136 faces inside body surface 138 and a smaller opening portion 134 faces outside body surface 139. Smaller opening portion 134 in one embodiment extends a first distance 134a from inside body surface 138 into second side portion 114. Larger opening portion 136 extends a second distance 136a from inside body surface 138 into second side portion 114. This embodiment of second pin opening 130 accepts a pin 200 with a tip portion 250 having a larger tip portion and a smaller tip portion or pin 200 having a tip portion 250 that is smaller than a pin body, where a part of the pin body is received in larger opening portion 136 and tip is received in smaller opening portion 134. Interface 135 between smaller opening portion 134 and larger opening portion 136 is a catch/stop surface in second pin opening 130.

As shown in FIG. 3B, smaller opening portion 134 and larger opening portion 136 may be reversed, where smaller opening portion 134 is positioned towards inside body surface 138 of second side portion 114 and larger opening portion 136 is positioned towards outside body surface 139 of second side portion 114. This configuration may be useful for a pin 200 having ball-lock pins or other locking pins 225. Locking pins 225 expand into larger opening portion 136, engage interface 135, and lock pin 200 in place when pin 200 is inserted into second pin opening 130.

Figure 3C:
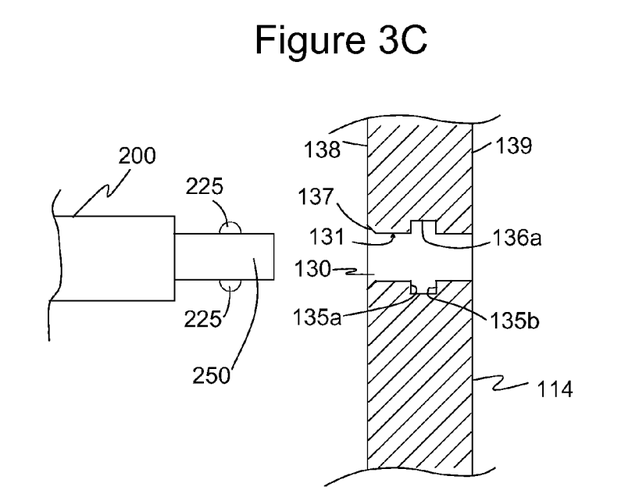
FIG. 3C is a cross sectional view of a portion of the second side member and a portion of one embodiment of a pin of the present invention showing spring-biased locking pins on the tip portion of the pin configured to engage the annular recess in the second side aperture.

Referring now to FIG. 3C, a cross-sectional view of second side portion 114 shows another embodiment of second pin opening 130. In this embodiment, a second side opening 130 includes a second annular recess 136a, such as a groove or slot that is located in an intermediate portion of second pin opening 130, preferably about midway between inside body surface 138 and outside body surface 139. Second annular recess 136a in one embodiment extends around second pin opening 130, such as an annular recess with a rounded or square profile. In other embodiments, second annular recess 136a includes one or more slots that are machined or formed into a portion or portions of inside surface 131 of second opening. Interfaces 135a, 135b define catch and/or stop surfaces within second opening recess 136a. Second annular recess 136a could be used with spring-biased locking pins 225 or with a retaining ring 290 on pin 200.

The embodiment of second pin opening 130 shown in FIG. 3C is useful, for example, with pin 200 having one or more spring-biased locking pins 225, where each locking pin 225 is biased to extend out of tip portion 250, such as extending into second opening recess 136a. Locking pins 225 engage interfaces 135a, 135b to hold pin 200 in place by restricting movement of pin 200 into or out of second pin opening 130. Optionally, second pin opening 130 has a chamfered or sloped entrance edge 137 that facilitates entry of pin tip portion 250 into second pin opening 130 by compressing locking pins 225 into tip portion 250 when inserted into second pin opening 130. Instead of locking pins 225, pin tip portion 250 could be adapted to receive a retaining ring with open ends, such as a circlip or C-clip. In another embodiment, retaining ring 290 is a spiral ring with overlapping ends or a hoop with open ends.

Figure 4:
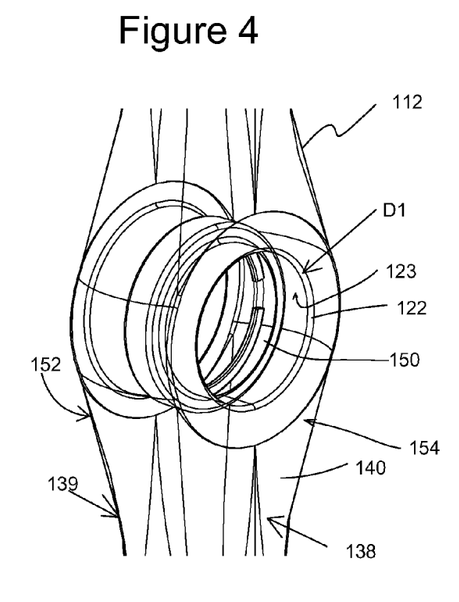
FIG. 4 is a front perspective view of part of the first hub region of the body FIG. 1A showing a retaining ring in the annular recess without the pin.
Figure 5:
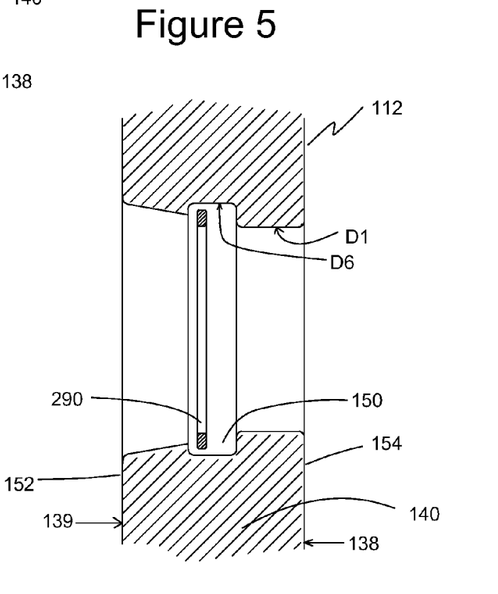
FIG. 5 is a cross sectional view of the hub region of FIG. 4 showing the profile of the first side aperture and the retaining ring in the annular recess.

Referring now to FIGS. 4 and 5, a perspective view and a cross-sectional view, respectively, show a portion of one embodiment of first side portion 112 with hub 140 and first pin opening 122. FIG. 4 shows first pin opening 122 as viewed by an observer looking into first pin opening 122 with inside body surface 138 in view. FIG. 5 is a front, cross sectional view of first pin opening 122. In one embodiment, first pin opening 122 is a cylindrical bore that defines an inside surface 123 and that extends between an outside face 152 and an inside face 154 of hub 140. In one embodiment, first pin opening 122 has a bore diameter D1 of about 0.35 inch. First pin opening 122 includes an annular recess 150 with diameter D6 that is greater than bore diameter D1. Annular recess 150 is coaxial with first pin opening 122 and is positioned between inside body surface 138 and outside body surface 139. Annular recess 150 is also positioned between regions of first pin opening 122 that each has a diameter smaller than diameter D6 of annular recess 150. Annular recess 150 is sized to receive a retaining ring 290 with open ends, such as a C-clip, snap ring, circlip, or retaining band.

Figure 6:
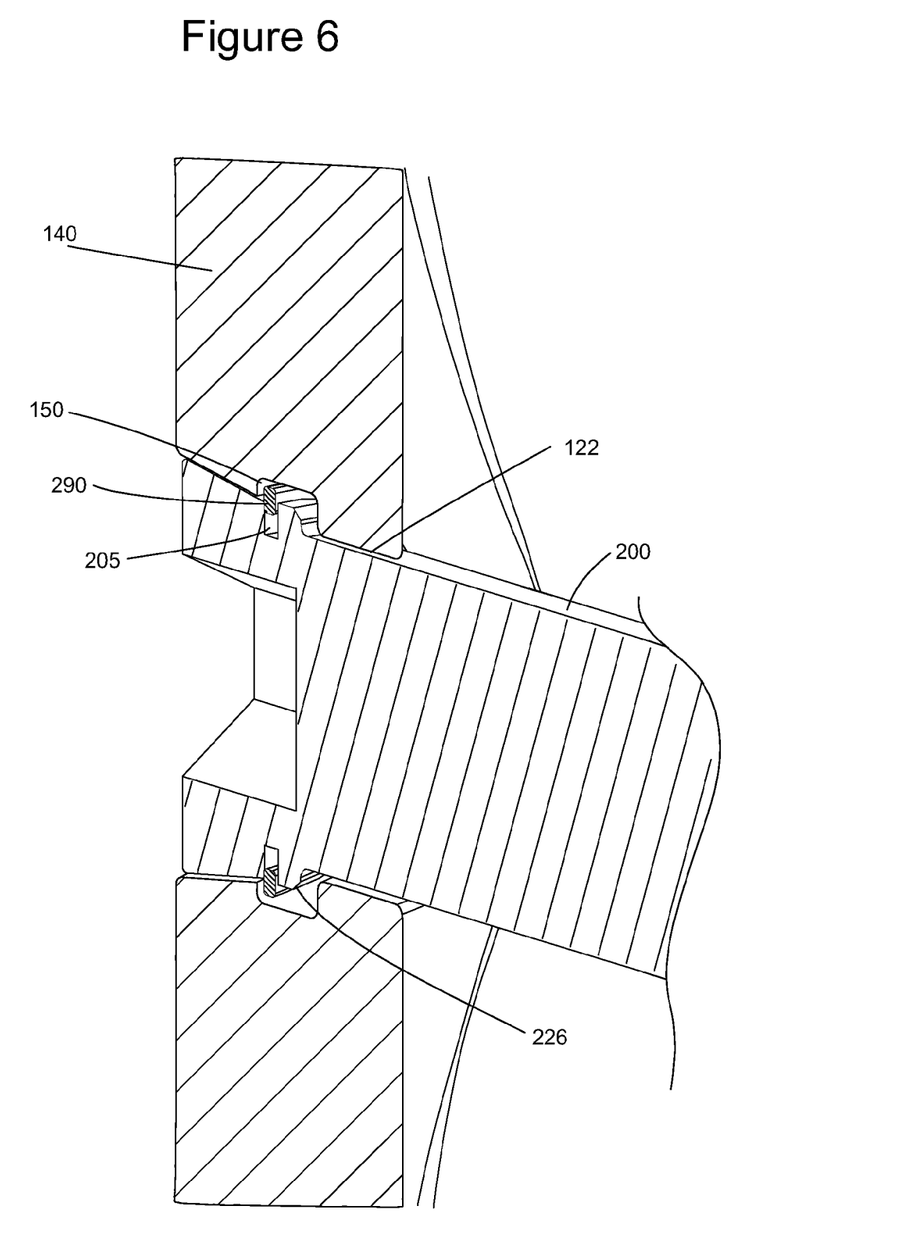
FIG. 6 is a perspective, sectional view of a portion of the shackle assembly of FIG. 1 showing the retaining ring, head portion of the pin, and the opening through the shackle body.

Referring no to FIG. 6, a perspective, cross sectional view illustrates first pin opening 122 through hub 140 with pin 200 extending therethrough. Retaining ring 190 is seated in annular groove 205 of pin 200 and extends radially into annular recess 150. As pin 200 is inserted axially through first pin opening 122, annular recess 150 allows retaining ring 290 to expand as needed to pass over a part of sloping outer surface 226 of pin 200 while also maintaining retaining ring 290 in annular recess 150. As pin 200 is advanced, retaining ring 290 seats into an annular groove 205 on pin 200 at which point retaining ring 290 is forcibly biased to a smaller circumferential size and snugly into annular groove 205 until retaining ring 900 reaches annular recess 50 at which point retaining ring 190 expands and extends radially into annular recess 150. Thus, retaining ring 290 locks pin 200 in first pin opening 122 by extending radially between annular groove 205 of pin 200 and annular recess 150 of first pin opening 122. Alternately, or in addition to retaining ring 290 in first pin opening 122, second pin opening 130 may similarly include an annular recess 150 and tip portion 250 of pin 200 may similarly include an annular groove 205. A retaining ring 290 in annular recess 150 of second pin opening 140 would similarly lock top portion in second pin opening 140.

In one embodiment, annular groove 205 is a circumferential slot in head portion 220 of pin 200. Annular groove 205 in another embodiment is a region of reduced diameter extending along part of head portion 220 and defining a shoulder engageable by retaining ring 290 to lock pin 200 with body 110.

Retaining ring 290 is first positioned in annular recess 150 so it will engage head portion 220 of pin 200 when pin 200 is inserted through first pin opening 122. As head portion 220 passes through first pin opening 122 in a direction towards second pin opening 130, it engages retaining ring 290, therefore expanding retaining ring 290 radially outward and slightly expanding inside diameter D7 to allow the fastener to pass. As the head of the fastener moves through retaining ring 290, annular groove 205 on head portion 220 aligns with retaining ring 290 and retaining ring 290 seats in annular groove 205 with retaining ring 290 extending into annular recess 150. Retaining ring 290 acts as a catch or shoulder between pin and body to prevent pin 200 from being removed from first pin opening 122.

Figure 7:
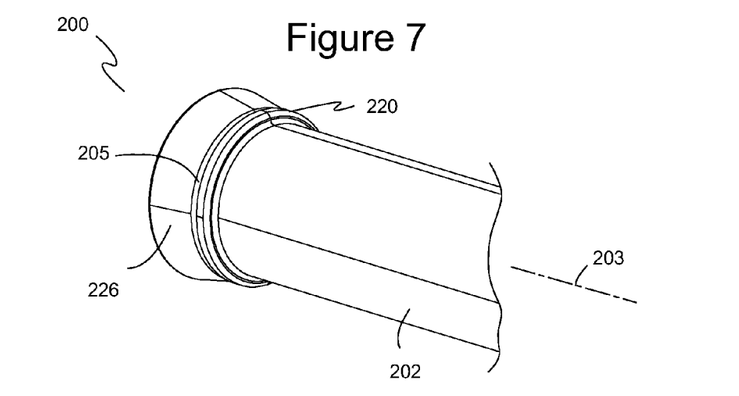
FIG. 7 is a perspective view of a first end portion and part of the pin body of one embodiment of a pin of the present invention showing a sloped outer surface region of increasing diameter and an annular groove.
Figure 8:
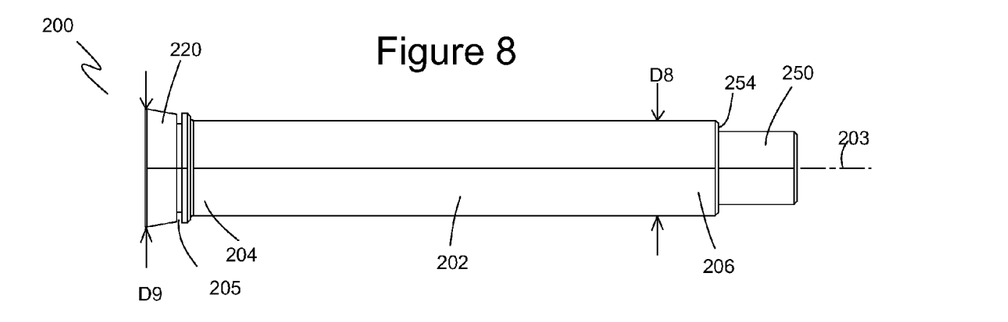
FIG. 8 is a front elevational view of one embodiment of a pin of the present invention showing the head portion with a sloped outer surface region and annular groove and a smooth tip portion.
Figure 9:
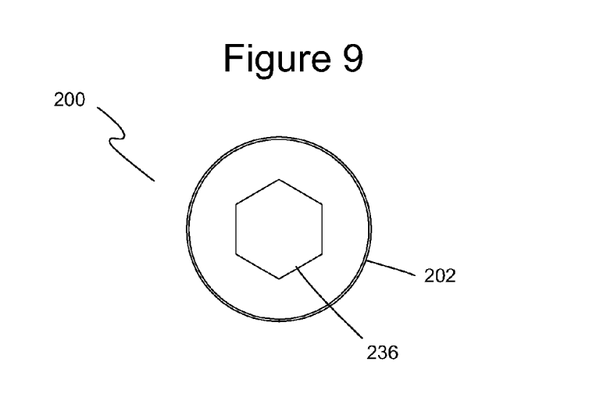
FIG. 9 is an end view of the pin of FIGS. 8 and 9 showing a tool recess.

Referring now to FIGS. 7-9, various views illustrate one embodiment of pin 200 with a body portion 202, a head portion 220, and a tip portion 250. FIG. 7 is a perspective view of head portion 220 and part of body portion 202. FIG. 8 is an elevational view of pin 200. FIG. 9 is an end view of head portion 220. Body portion 202 in one embodiment is a cylindrical solid with a diameter D8 and that extends along a central longitudinal axis 203. Pin body portion 202 has a first end 204 and a second end 206. Head portion 220 is included in or connected to or formed with first end 204. Tip portion 250 is included in or connected to or formed with second end 206. Head portion 220 includes an annular groove 205 that is the seat for retaining ring 290.

In one embodiment, head portion 220 has a conical or sloping outer surface 226 that tapers from a larger diameter D9 to smaller diameter, such as diameter D8 of pin body portion 202 (D8, D9 are shown in FIG. 8). When annular groove 205 is positioned along sloping outer surface 226, sloping outer surface 226 causes retaining ring 290 to expand as head portion 220 passes through it. In this way, sloping outer surface 226 facilitates expanding retaining ring 290 and seating it in annular groove 205.

In one embodiment as shown in FIG. 9, a tool recess 236 extends into head portion and/or into first end 204 of body portion 202 along central longitudinal axis 203. Tool recess 236 preferably has a hexagonal shape to accept hex wrenches for turning pin 200. Other shapes of recess are acceptable, including a square, a slot, a star, intersecting slots (e.g., for a Phillips screwdriver), a triangle, and other regular or irregular shapes configured to interacting with one of a standard, conventional tool or a custom-made tool designed for the shape of the recess. It is contemplated that pin 200 can be tapped or pressed into/through first opening 122 without the need for tool recess 236.

Figure 10:
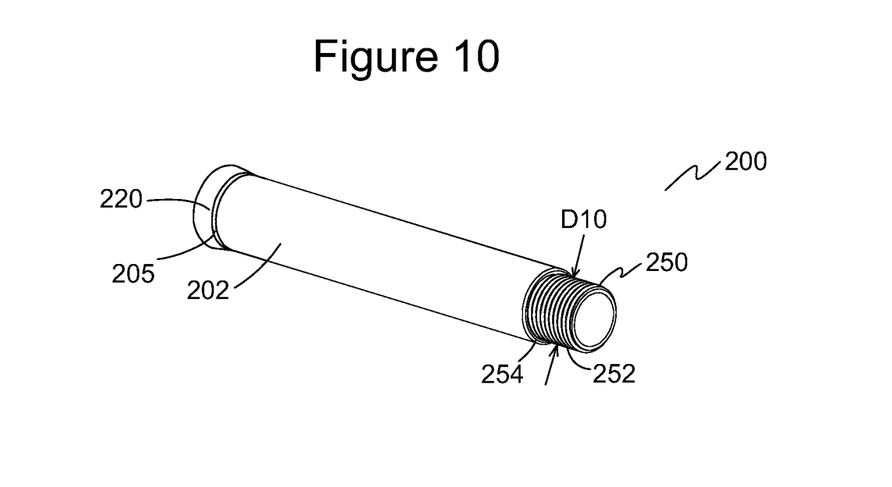
FIG. 10 is a perspective view of another embodiment of a pin of the present invention showing a head portion and threaded tip portion.

Turning now to FIG. 10, there is shown an embodiment of tip portion 250 sized to fit into second pin opening 130 and including optional screw threads 252. Tip portion 250 has a tip diameter D10 that is preferably but not necessarily smaller than diameter D8 of pin body portion 202. When tip diameter D10 is smaller than diameter D8 of body portion 202, pin 200 defines a shoulder 254 between tip portion 250 and pin body portion 202. If diameter D2 of second pin opening 130 is smaller than diameter D8 of pin body portion 202, shoulder 254 abuts body 110 to prevent pin 200 from passing further into second pin opening 130. Tip portion 250 in one embodiment is a smooth cylinder. In other embodiments, tip portion 250 optionally has screw threads 252. Screw threads 252 facilitate advancement of pin 200 into/through first and second openings 122, 132. In another embodiment, shoulder 254 passes into a larger opening portion 136 of second pin opening 130, such as second pin opening 130 shown in FIG. 3A. In yet another embodiment, tip portion 250 has locking pins 225 as described above and shown in FIG. 3C.

Figure 11:
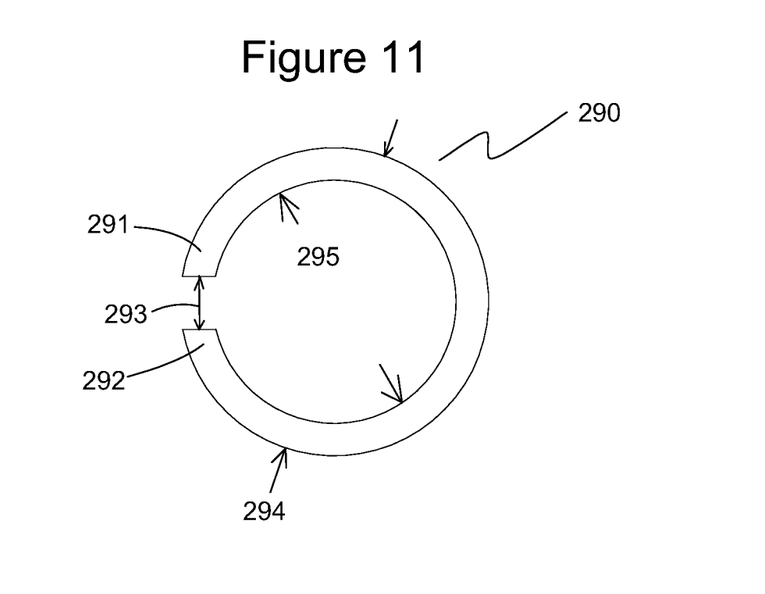
FIG. 11 is a plan view of one embodiment of a retaining ring of the present invention.

Referring now to FIG. 11, a plan view illustrates one embodiment of retaining ring 290. Retaining ring 290 has a circular shape with open ends 291, 292 that define a gap 293 therebetween with retaining ring 290 standing alone. In one embodiment, retaining ring 290 is made of carbon spring steel, stainless steel, or beryllium copper. Other materials are also acceptable. Due to the spring characteristic of retaining ring 290, gap 293 may be increased or reduced to similarly increase or reduce the ring outer diameter 294 and the ring inner diameter 295 with retaining ring 290 being biased towards its freestanding size. For example, retaining ring 290 is compressed to fit into first opening 122 and then expands to a larger size when moved to annular recess 150. When pin 200 then passes through retaining ring 290, tapered head portion 220 expands retaining ring 290 to a further larger size until ring returns to a smaller shape when it seats in annular groove 205 of pin 200. The cross sectional shape of retaining ring 290 can be circular, rectangular, a rounded rectangle, or other shapes. Retaining ring 290 may include tabs (not shown) on 291, 292 for opening or closing retaining ring with a retaining ring tool.

Figure 12:
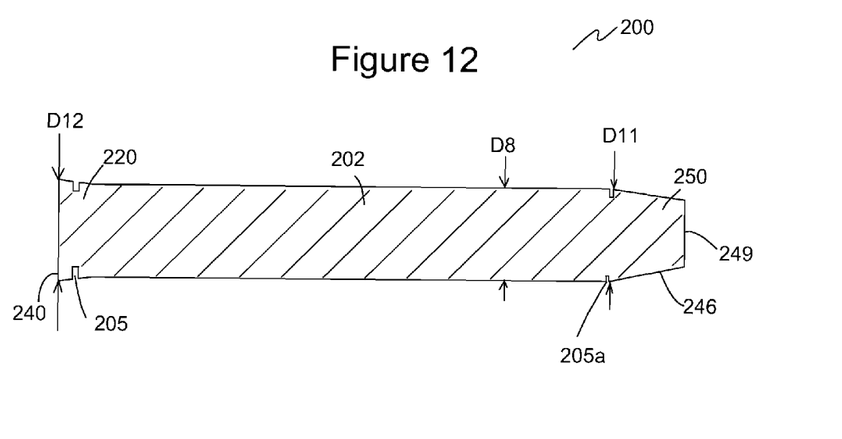
FIG. 12 is a cross-sectional view of another embodiment of a pin of the present invention showing an annular groove on the head portion and on the tip portion.

Turning now to FIG. 12, a cross sectional view shows another embodiment of pin 200. Here, pin 200 includes annular groove 205 on head portion 220 and annular groove 205a on tip portion 250. One or both of annular grooves 205, 205a are included. Tip portion 250 is optionally tapered to facilitate advancing tip portion 250 through retaining ring 290 in second pin opening 130. Similarly, head portion 220 is optionally tapered to facilitate advancing head portion 220 through retaining ring 290 in first pin opening 122. This embodiment of pin 200 is useful with body 110 having a retaining ring 290 in annular recess 150 of each of first and second openings 122, 130 to engage annular grooves 205, 205a, respectively.

Pin 200 is typically cylindrical since this shape permits rotation, but pin 200 may have other cross-sectional shapes, such as rectangular, square, or other geometries as appropriate for the method of insertion or advancement through first opening 122 and into second opening 130. For example, an embodiment of pin 200 could have a square cross-sectional shape when it is merely pressed without rotation through first opening 122 and into second opening 130, where retaining ring 290 also has a corresponding square opening.

Figure 13A:
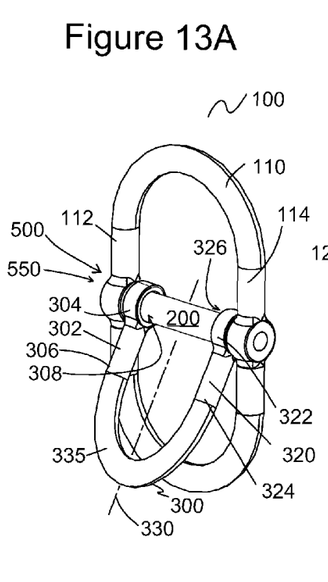
FIG. 13A is perspective view of another embodiment of a shackle assembly of the present invention showing a body with a closed geometry and a second body member.

Turning now to FIG. 13a, another embodiment is shown of shackle assembly 100 with body 110, pin 200, and an optional second body member 300. Second body member 300 has a longitudinal first side 302 with a first end 304, a second end 306, and a first opening 308 extending transversely through first end 304. A longitudinal second side 320 is positioned opposite and aligned substantially parallel to first side 302. Second side has a first end 322, a second end 324, and a second opening 326 extending transversely through first end 322. Preferably, both first opening 308 and second opening 326 are axially-aligned through-openings sized and configured to receive pin 200. In another embodiment, second opening 326 extends only partially through first end 322 and may be threaded to receive threads 252 of pin 200, such as when second body member 300 is configured with second opening 326 positioned outside of body 110. First and second sides 302, 304 are preferably straight cylindrical segments that are substantially parallel to one another. In another embodiment, first and second sides 302, 304 are curved and/or angled with respect to a central longitudinal axis 330.

A second body member end portion 335 extends between second end 306 of first side 302 and second end 324 of second side 320, preferably along an arc or curve, but optionally along a line or lines. In some embodiments, second body member end portion 335 is merely a plane of intersection between curved or angled embodiments of first and second sides 302, 304. Second body member 300 in one embodiment is configured with first ends 304, 322 of first and second sides 322, 324, respectively, disposed between first side portion 112 and second side portion 114 of body 110 (i.e., inside of body 110). In another embodiment, one or both of first ends 304, 322 of second body member 300 are positioned outside of first side portion 112 and/or second side portion 114 of body 110. Preferably, second body member 300 swivels or pivots about pin 200.

Figure 13B:
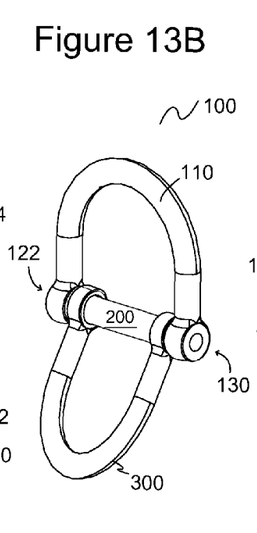
FIG. 13B is perspective view of another embodiment of a shackle assembly of the present invention showing a first body member and a second body member, each having a U-shape

As shown in FIG. 13b, there is shown an example of body 110 with a U-shaped structure that defines an open geometry. Pin 200 extends through first pin opening 122 and second pin opening 130. Second body member 300 is optionally included.

Figure 13C:
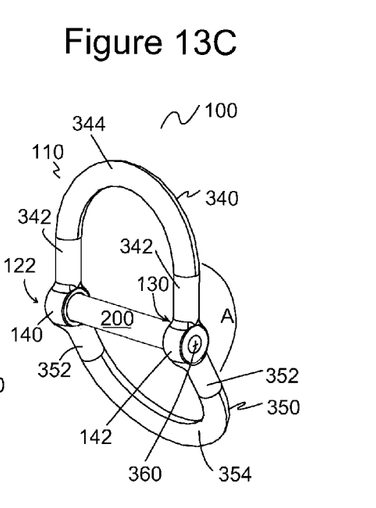
FIG. 13C is a perspective view of another embodiment of a shackle assembly of the present invention showing the body defining an angle between a first body portion and a second body portion.

Turning now to FIG. 13c, another embodiment of body 110 is shown where body 110 is angled and has a first body member 340 and a second body member 350. First body member 340 has a pair of first leg portions 342 extending between first end portion 344 and hubs 140, 142. Second body member 350 has a pair of second leg portions 352 extending between second end portion 354 and hubs 140, 142. First body member 340 defines an angle A with second body member 350, where angle A is between 90 and 180 degrees and preferably about 150 degrees. As with other embodiments, pin 200 passes through first and second openings 122, 130 of body 110. In one embodiment, first and second openings 122, 130 are located at a vertex 360 of angle A where first body member 340 and second body member 350 meet, but is not limited to this location. The angle may optionally be imparted along first leg portions 342 or along second leg portions 352.

In use, one or more retaining ring 290 between pin 200 and body 110 allows pin 200 to be retained by body 110. For example, a retaining ring 290 is compressed to a smaller diameter and placed through first pin opening 122 where it expands in annular recess 150. Pin 200 with one or more corresponding annular grooves 205 is inserted through first pin opening 122 with tip portion 250 extending into or through second pin opening 130. While doing so, each retaining ring 290 seats in annular groove(s) 205 of pin 200, thereby preventing pin 200 from being removed from body 110.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A shackle assembly comprising:
  a unitary rigid body defining an open region, the body comprising:
    a first side member with a first side aperture extending transversely therethrough;
    a second side member spaced apart from the first side member and having a second side aperture extending transversely at least partially through the second side member, the second side aperture positioned opposite the first side aperture and axially aligned with the first side aperture; and
    at least one end portion extending between and connecting the first side member and the second side member;
    wherein at least one of the first side aperture and the second side aperture includes an annular recess;
  a pin having a central longitudinal axis and comprising:
    a first end portion received in the first side aperture;
    a second end portion received in the second side aperture; and
    a pin body extending between the first end portion and the second end portion along the central longitudinal axis;
    wherein at least one of the first end portion and the second end portion defines an annular groove corresponding to the annular recess; and
  at least one annular retaining ring with a pair of open ends, the at least one annular retaining ring seated in the annular groove and extending radially into the corresponding annular recess, thereby preventing the pin from being removed from the body.

2. The shackle assembly of claim 1, wherein the at least one end portion includes a first end portion and a second end portion and the body defines a closed geometry.

3. The shackle assembly of claim 2, wherein the closed geometry is selected from the group consisting of a loop, a ring, an oval, a triangle, a trapezoid, and a rectangle.

4. The shackle assembly of claim 1, wherein the first end portion has an outside surface with a sloped region of increasing diameter from the pin body and the first side aperture has a corresponding inside surface with a sloped region of increasing diameter corresponding to the outside surface of first end portion.

5. The shackle assembly of claim 1, wherein the second end portion is threaded and threadably engages the second side aperture.

6. The shackle assembly of claim 1, wherein
  the first side aperture defines a first annular recess and the second side aperture defines a second annular recess;
  wherein the first end portion defines a first annular groove and the second end portion defines a second annular groove; and
  wherein the at least one annular ring includes a first annular ring corresponding to the first annular recess and a second annular ring corresponding to the second annular recess.

7. The shackle assembly of claim 1, wherein the first end portion has a sloped region of increasing diameter relative to the pin body and the second end portion has sloped region of decreasing diameter relative to the pin body.

8. The shackle assembly of claim 1, further comprising a second body member comprising:
  a first longitudinal portion with a first end, a second end, and a first opening through the second end of the first longitudinal portion;
  a second longitudinal portion with a first end, a second end, and a second opening through the second end of the second longitudinal portion; and
  an end portion connected between the first end of the first longitudinal portion and the first end of the second longitudinal portion;
  wherein the pin extends through the first opening and the second opening of the second body member.

9. A shackle assembly kit comprising:
  a unitary rigid body defining an open region, the body comprising:
    a first side member with a first side aperture extending transversely therethrough, the first side aperture having a first inside surface;

a second side member spaced apart from the first side member and having a second side aperture extending transversely at least partially through the second side member, the second side aperture positioned opposite the first side aperture and axially aligned with the first side aperture; and at least one end portion extending between and connecting the first side member and the second side member;

wherein at least one of the first side aperture and the second side aperture has an annular recess;

a pin having a central longitudinal axis and comprising:
  a first end portion sized to be received least partially within the first side aperture;
  a second end portion sized to be received least partially within the second side aperture; and
  a pin body extending between the first end portion and the second end portion along the central longitudinal axis, the pin body sized to pass through the first side aperture; and
  wherein at least one of the first end portion and the second end portion has an annular groove corresponding to the annular recess of the respective first side aperture and the second side aperture;

at least one annular retaining ring with a pair of open ends, the at least one annular retaining ring adapted to be seated in the annular groove and extend radially into the corresponding annular recess, thereby preventing the pin from being removed from the body when the pin is installed through the first side aperture with the second end portion received in the second side aperture; and instructions for installing the at least one annular ring in the annular recess, advancing the pin through the first opening and into the second opening with the at least one annular ring seating in the annular groove, thereby preventing the pin from being removed from the body.

10. The kit of claim 9, wherein the at least one end portion includes a first end portion and a second end portion and the body defines a closed geometry.

11. The kit of claim 9, wherein the closed geometry is selected from the group consisting of a loop, a ring, an oval, a triangle, a trapezoid, and a rectangle.

12. The kit of claim 9, wherein the first end portion of the pin has a sloped outside surface region of increasing diameter relative to the pin body and wherein the first side aperture has a sloped inside surface region of increasing diameter corresponding to the sloped outside surface region of first end portion.

13. The kit of claim 9, further comprising a second body member comprising:
  a first longitudinal portion with a first end, a second end, and a first aperture through the second end of the first longitudinal portion;
  a second longitudinal portion with a first end, a second end, and a second aperture through the second end of the second longitudinal portion; and
  an end portion connected between the first end of the first longitudinal portion and the first end of the second longitudinal portion;
  wherein the pin extends through first aperture and the second aperture of the second body member and wherein the instructions include assembling the pin through the second body member.

14. A shackle assembly comprising:
a body comprising:
  a first side portion with a first opening extending through the first side portion, the first opening having an inside surface defining an annular recess that is coaxial with the first opening;
  a second side portion spaced from the first side portion and having a second opening extending at least partially through the second side portion, the second opening axially aligned with the first opening; and
  at least one end portion extending between and connecting the first side portion and the second side portion;
a pin having a central longitudinal axis and comprising:
  a head portion disposed at least partially within the first opening, the head portion defining an annular groove corresponding to the annular recess;
  a tip portion disposed at least partially within the second opening;
  a pin body extending between the head portion and the tip portion along the central longitudinal axis; and
  a retaining ring seated in the annular groove and extending radially into the annular recess, thereby retaining the head portion in the first opening.

* * * * *